Figure 5:
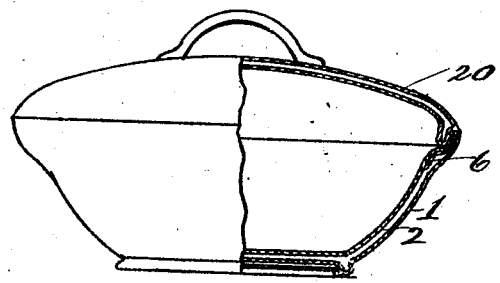

Jan. 12, 1926.  
G. R. FASSETT  
1,569,734  
INSULATED VESSEL FOR COOKING, HOLDING, AND SERVING FOOD  
Filed Sept. 10, 1923  
2 Sheets-Sheet 1
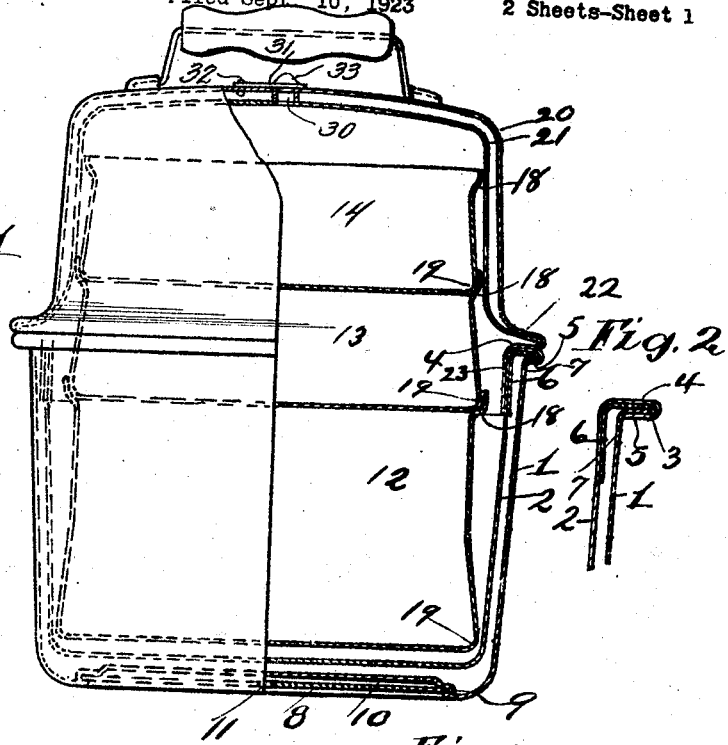
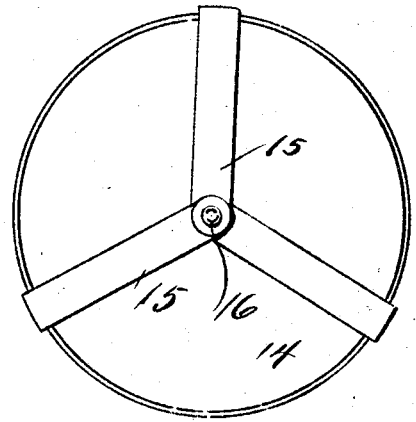
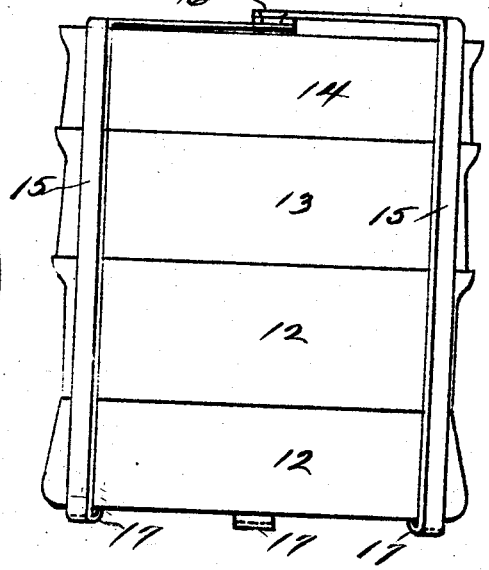

Jan. 12, 1926.  
G. R. FASSETT  
1,569,734  
INSULATED VESSEL FOR COOKING, HOLDING, AND SERVING FOOD  
Filed Sept. 10, 1923  2 Sheets-Sheet 2

Inventor  
George R. Fassett  
by Wm. M. Monroe  
Attorney

Patented Jan. 12, 1926.

1,569,734

UNITED STATES PATENT OFFICE.

GEORGE R. FASSETT, OF LAKEWOOD, OHIO, ASSIGNOR TO WILLIAM J. SANBORN, OF LAKEWOOD, OHIO.

INSULATED VESSEL FOR COOKING, HOLDING, AND SERVING FOOD.

Application filed September 10, 1923. Serial No. 661,864.

*To all whom it may concern:*

Be it known that I, GEORGE R. FASSETT, a citizen of the United States, and resident of Lakewood, in the county of Cuyahoga and State of Ohio, have invented certain new and useful Improvements in Insulated Vessels for Cooking, Holding, and Serving Food, of which I hereby declare the following to be a full, clear, and exact description, such as will enable others skilled in the art to which it appertains to make and use the same.

The objects of the invention are to provide an insulated form of hollow utensil, preferably formed of sheet metal, in which high or low degrees of temperature can be preserved for a long time. When this utensil is employed in cooking, and the cooking degree of temperature has been attained, approximately this degree can be maintained with the use of a much less amount of fuel, thus economizing greatly in the use of fuel.

With this device, also, there will be no danger of scorching or burning the food, since the insulation will absorb the excess of heat. Also an insulated cover may be provided for the utensil.

By the use of this device, all the flavor and aroma of the food will be retained and the food will be kept moist and in a palatable condition, and when meats and fresh vegetables, are being cooked they will be thoroughly stewed or boiled without the addition of water, and the moisture contained in the food will be retained and will be sufficient to soften the food.

To accomplish these results, the vessel is composed of outer and inner shells, preferably of sheet metal and spaced apart, to provide air or other insulation between them, by means of which the temperature of the interior, and of the food therein, is retained and the heat will not be conducted away therefrom. The enveloping layer of air, or other insulating material, such as asbestos, will form a non-conductor which will obstruct the radiation of heat from the inner wall. This enclosed lining is also highly heated by contact with the outer member and hence must lose its heat before the temperature in the inner vessel can be reduced, which takes a long time.

The invention also includes the provision of a metal plate, inserted in the bottom of the outer wall and spaced from the outer wall, which prevents the heat of the stove burner from destroying the bottom wall of the vessel, especially when this vessel is composed of aluminum or other metal that may be injured by the direct application of burner heat thereto.

It also includes a metallic annular reinforcement, or insertion for the upper edges of the spaced inner and outer members of the vessel.

It includes the construction of a nest or stack of food containers, to be inserted in the double walled vessel, so that foods of several kinds can be cooked at the same time therein.

It also includes an elevated cover, designed to enclose such food containers, and a special device for withdrawing the containers from the cooking utensil.

The invention is hereinafter described, illustrated in the accompanying drawings, and specifically pointed out in the claims.

It includes a form of construction adapted to be used in many ways, such as for a sterilizer and for invalids, or sick room containers to keep liquids and food for some hours at a fixed temperature, or to keep liquid foods for infants and small children at fixed temperatures.

Figure 6:
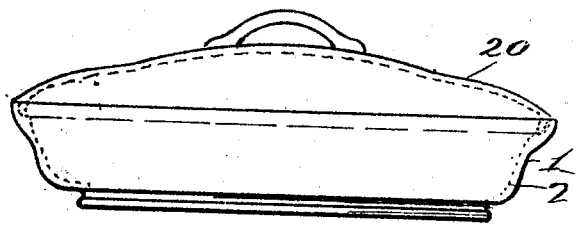
Figure 7:
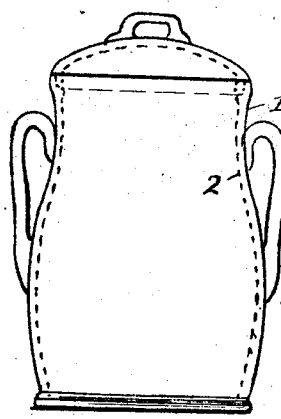

In the accompanying drawings, Fig. 1 is a vertical central section of the device; Fig. 2 is an enlarged section of the reinforced rim of the utensil, showing the manner of constructing the joint; Fig. 3 is a side elevation of the stack of food containers, adapted to be inserted in the vessel, and illustrating the use of the tool for removing the food containers; Fig. 4 is a plan of the same; Figs. 5, 6, and 7 are side elevations of metal service dishes employed to keep foods or beverages either hot or cold.

In these views, 1 is the outer shell of the vessel; 2 is the inner shell. These shells are spaced apart and their rims are flanged at 3 and 4, respectively, and the outer rim 4, is turned down and over the edge of the rim, 3, at 5.

An annular metal rim, 6, or reinforcing band, is inserted in the joint between these rim edges. This band is made preferably of steel and strengthens the rims when the shells are formed of soft metal, and is made of thicker and harder metal than the walls, and may also extend downward between the said outer and inner walls.

An orifice, 7, in the outer wall permits expanded air to escape and prevents an explosion.

A small opening, 30, is formed in the cover, which is normally closed by a thin elongated plate, 31, secured to the cover at the end furthest from the opening at 32. Excessive steam pressure in the vessel will lift this plate and permit the steam to escape.

The point of attachment is also a pivot on which the plate can be swung aside by the cook to ascertain when a steam generating temperature has been attained. A lug or flange, 33, on the plate permits this action.

The bottom of the lower shell is reinforced by means of the steel disc, 8, inserted in an annular groove, 9, formed therein.

This disc is spaced from the bottom, at 10, and is provided with a vent opening, 11, through which expanded air may escape.

This disc prevents the bottom shell from burning.

12, 13, and 14 are nested food containers.

A unique handle, 15, is constructed by means of which the food containers can be removed from the vessel. This is formed of three metal arms, pivoted together at the top at 16, and having inwardly extending fingers, 17, 17, which pass underneath the containers and by means of which the containers can be lifted out of the vessel.

Each container is provided with a cupped rim, 18, and the bottom edge, 19, of the adjoining container, rests therein. They can be arranged in any order desired, but the lower container is the largest and ordinarily will be used for meats or soups, and the upper ones for vegetables or desserts so that an entire meal can be cooked at one time.

The cover is also formed of outer and inner walls, 20 and 21, and a rim is formed of both members at 22, the outer member being then reduced in diameter and introduced into the vessel at 23.

Servidors, or dishes employed to keep food hot or cold, such as are shown in Figs. 5 and 6 and 7, may be constructed of metal and provided with hollow walls in the manner previously described, and will serve the useful purpose of keeping food or beverages hot or cold for many hours, and will be a matter of great convenience to housekeepers.

The device may be made in any form or size and can be adapted for use for any purpose desired, viz: to keep food or liquids at any desired degree of temperature or to retain the temperature of hot water or other heated material in foot or bed warmers.

Having described the invention, what I claim as new, and desire to secure by Letters Patent, is:

1. A vessel composed of inner and outer walls, said walls being connected above the bottom of the vessel, a metal plate disposed exteriorly to the outer wall at the bottom of the vessel, the outer wall being so formed as to support said metal plate and said outer wall at the bottom of the vessel being spaced from the metal plate whereby to leave an air space between the metal plate and the bottom wall.

2. A double walled vessel comprising inner and outer walls spaced apart, both of said walls being horizontally flanged at their upper margins and said flanges overlapping each other, and an annular reinforcing metal plate disposed between the confronting faces of said flanges, the flange of the inner wall being extended downward past the edge of the reinforcing plate and the edge of the flange of the outer wall and then extending inward beneath the flange of the outer wall.

3. In a utensil for the purposes described, a double walled vessel, composed of inner and outer walls spaced apart and horizontally flanged at their upper edges, said flanges overlapping each other and rigidly secured together, and an annular reinforcing metal plate inserted between said flanges and extending downwardly into the annular space between said spaced walls.

4. A hollow vessel composed of spaced outer and inner walls attached to each other at their upper margins, the bottom of the outer wall being formed to provide an annular groove, and a metallic disk having its margin inserted in said groove and being supported thereby, the disk being spaced from the outer face of said outer wall.

5. A hollow vessel composed of spaced inner and outer walls attached to each other at their upper margins, the bottom of the outer wall being formed to provide an annular groove, and a reinforcing metallic disk disposed within said groove and spaced from the outer wall, the metallic disk and the outer wall being formed each with a vent opening.

6. A utensil for the purpose described, having outer and inner walls, spaced apart, the peripheral edge of the outer wall being flanged outwardly, and the corresponding edge of the inner wall being flanged outwardly, and wider than the other flange, and extending downwardly underneath said other flange, and an annular band of reinforcing material inserted between said flanges and extending along the inner sides of said walls between the same.

In testimony whereof, I hereunto set my hand this Aug. 14, 1923.

GEORGE R. FASSETT.